Patented Aug. 17, 1937

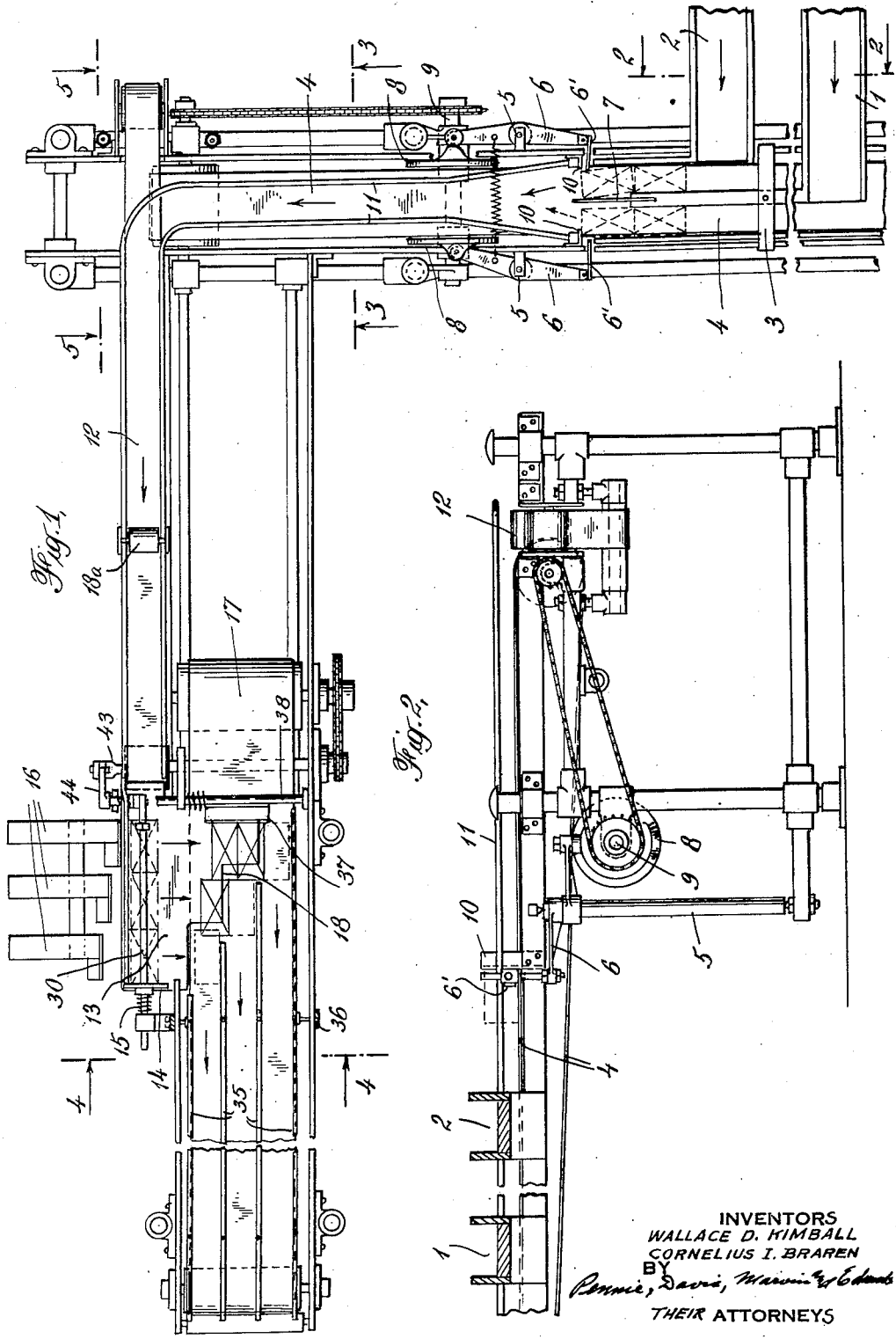

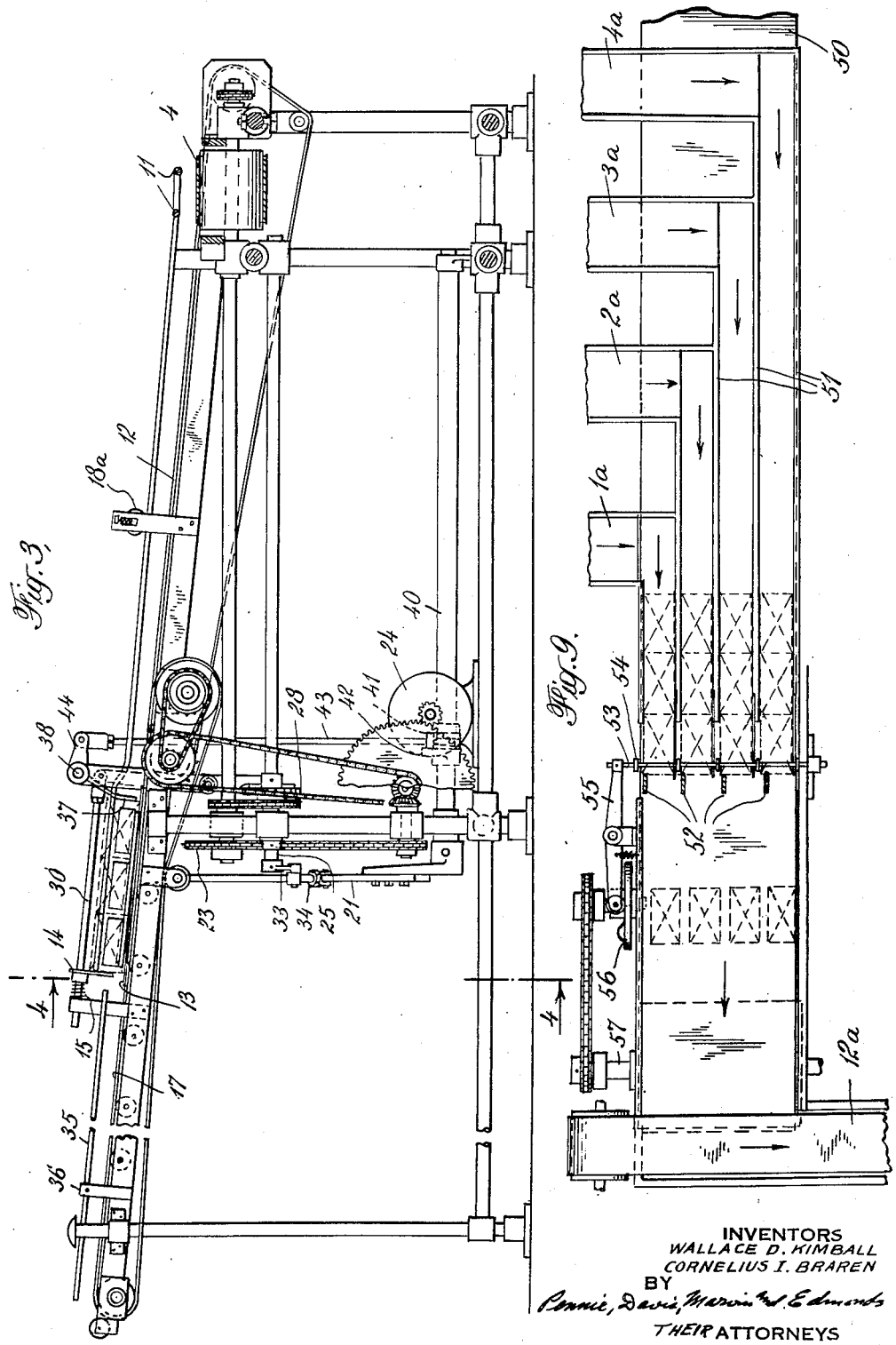

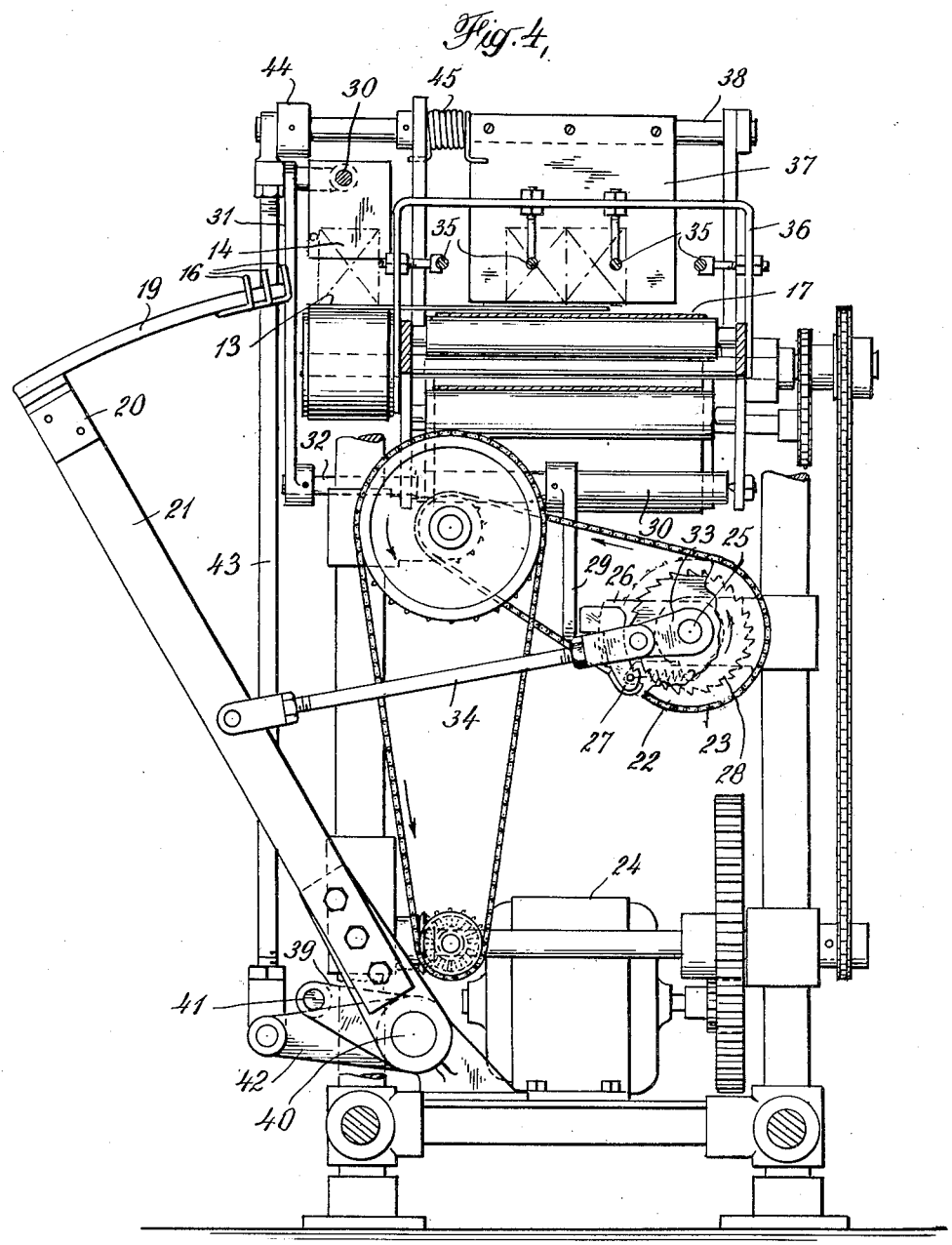

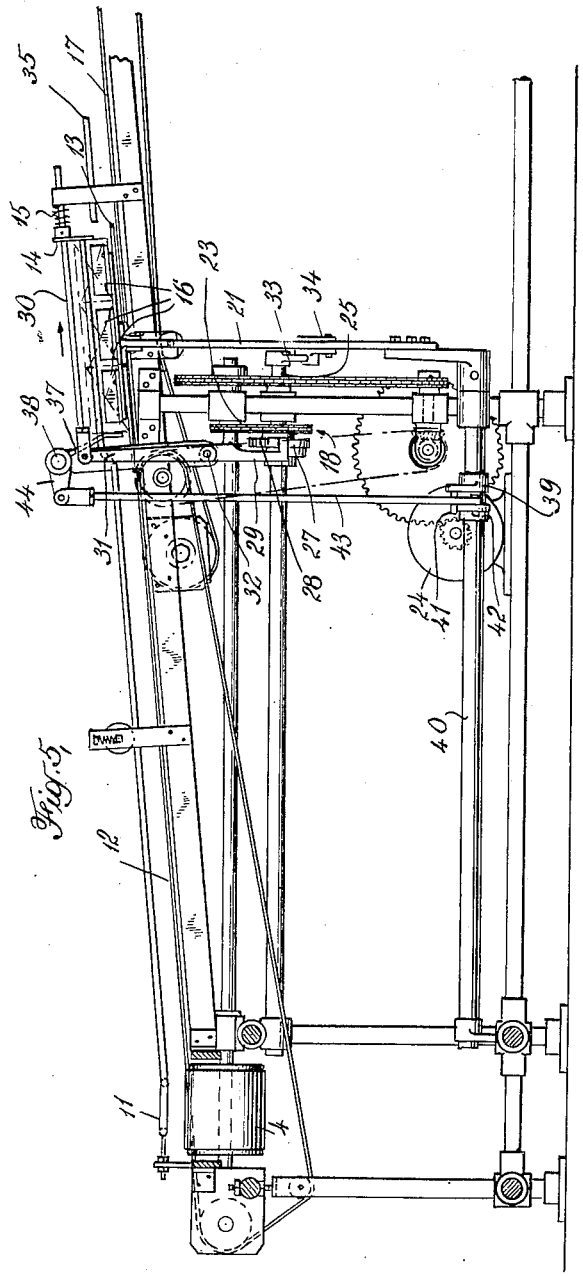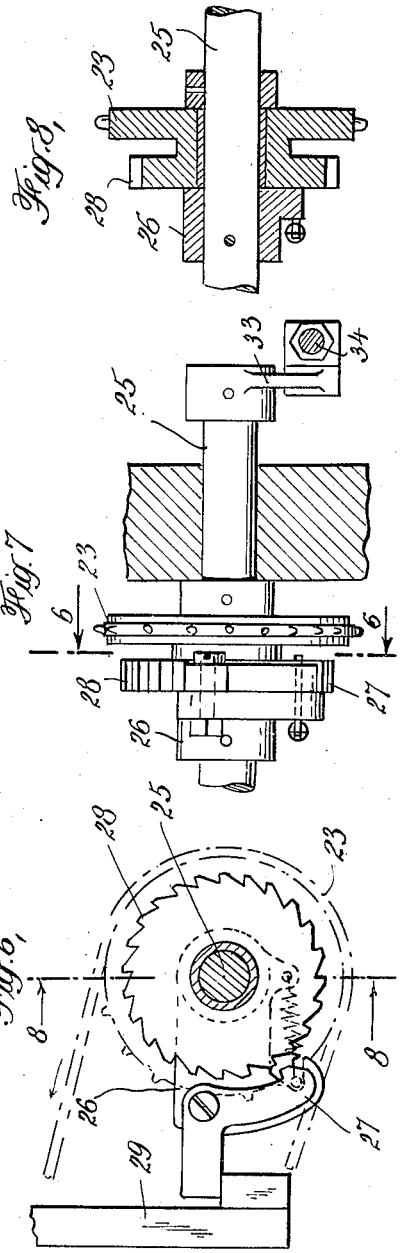

2,090,129

UNITED STATES PATENT OFFICE 2,090,129

PACKAGE COLLECTOR

Wallace D. Kimball, Jackson Heights, and Cornelius I. Braren, Jamaica, N. Y., assignors to Standard-Knapp Corporation, Long Island City, N. Y., a corporation of New York Application September 2, 1933, Serial No. 687,958

9 Claims. (Cl. 198—31)

This invention relates to improvements in package collectors such as are employed in manufacturing establishments to collect the manufactured product from the machines which perform the last operation in the finishing of the individual articles for market (usually labeling or wrapping) and bringing them together in predetermined sequence for packing in shipping cases or cartons. Such machines are largely used in conjunction with automatic carton packing machines and are designed to supply the articles to the packing machines in the proper arrangement to make up the desired charge, for example, if the layers of articles in the case are made up of rows of three articles each, the collecting machines will be designed to deliver the articles to the feed conveyor of the packing machine in three rows or in successive groups of three.

The object of the present invention is to provide a machine of this class which will take articles from a plurality of machines in irregular sequences and deliver them in unbroken lines or at a uniform rate or in complete groups of the desired number to the packing machine to thereby insure a complete charge in each carton.

Another object of the present invention is to provide a machine of this class in which the supply of articles from any of a plurality of machines may be interrupted without affecting the delivery of articles to the packing machine at a rate which is uniform in each of a plurality of lines.

A further object of the invention is to provide a machine of the class described which is entirely automatic in its operation, requiring no attendance whatsoever in normal operation, and which may therefore be made an adjunct to the packaging machine which it serves without any additional labor cost, as the packaging machine attendant can readily give the machine sufficient attention to note any jamming or breakdowns without interfering with his other duties.

The machine is specially designed for rapid operation in that its operating parts for the most part move continuously while those that have a reciprocating motion are light in weight and are not operated at high linear speed.

In the accompanying drawings we have illustrated a preferred embodiment of our invention, and in said drawings, Fig. 1 is a plan view of the machine;

Fig. 2 is a side elevation of the machine looking from the right of Fig. 1 with the parts shown in section on lines 2—2;

Fig. 3 is a side elevation at right angles to Fig. 2, part of the machine being shown in section on line 3—3 of Fig. 1;

Fig. 4 is an enlarged vertical sectional view on the line 4—4 of Figs. 1 and 3;

Fig. 5 is a side elevation of the machine shown in Fig. 1 partly in section on the line 5—5;

Figs. 6, 7, and 8 are detail views of the clutch mechanism through which the operation of the feed plungers is controlled; and Fig. 9 is a plan view of a modified structure.

Referring to the drawings, particularly to Fig. 1, 1 and 2 indicate the feed chutes through which the articles are delivered to the machine from the labeling machine, wrapping machine or other source. It will be understood that the articles may be delivered along the chutes in continuous succession, or there may be intervals of more or less duration in which no articles are fed. Chute 1 is supported from above the belt on a suitable structure 3 so as to deliver the articles fed by it to the far side of the feed belt 4, whereas chute 2 delivers the articles to the inner side of the feed belt. There will thus be advanced by the feed belt 4, two lines of articles either or both of which may have gaps of varying lengths. The feed belt 4 is driven continuously through gearing, not shown, by the driving motor of the machine at a rate with respect to the rate of delivery of the articles thereto to advance all the articles fed to it in a single row when both chutes 1 and 2 are delivering articles thereto in an unbroken chain.

The two rows of articles on the belt 4 are arranged in a single row by the escapement mechanism shown in Figs. 1 and 2. This mechanism comprises a pair of vertical rockshafts 5 each of which carries a stop lever 6 provided with a stop 6' adapted to be projected against the side of the articles of the adjacent row and to press the articles toward the middle of the belt and against a stop plate 7 suspended from the superstructure 3 over the middle of the belt. Each of the rockshafts 5 is operated by its own cam 8 carried by a continuously driven cam shaft 9 extending across the machine beneath the feed belt 4. The cam projections on the cam 8 are oppositely positioned with respect to each other so that one stop member 6 will move inwardly to shift the adjacent article in the manner described during the interval that the other stop is retracted.

The movable stops 6' cooperate with fixed stops 10 supported in position to overlie the belt 4 and engage the articles on the belt in a normal course of movement unless deflected by the movable stop 6'. The stops 10 are fixed at the ends of the two guide rails 11 which overlie the belt 4 beyond the escapement mechanism, the two rails being inwardly inclined beyond the stops 10 to thereby deflect the articles advanced from either line on the belt 4 in advance of the escapement into a single row on the portion of the belt beyond the escapement.

The operation of the escapement will be obvious. The rows of articles advanced by the belt are stopped by the fixed stops 10 and the articles are then alternately deflected out of engagement with their stops so as to be advanced by the rapidly moving belt while the articles of the other row are held stationary with the belt slipping beneath.

In the machine shown the single row of articles on the belt 4 is turned at right angles by the guides 11 onto a second belt 12 to continuously advance the articles in a single row. This arrangement is, however, optional depending upon the layout of the particular factory in which the machine is to be installed. If the factory arrangement does not require any change in direction of the article fed the belt 4 may be arranged to feed the articles directly to the assembly mechanism which will now be described.

This mechanism comprises a bed plate or table 13 arranged in the line of movement of the belt 12 to receive the articles delivered therefrom. Overlying the table 13 at the far edge of the table with respect to the belt 12 is a movable stop 14 which is yieldingly held by a spring 15 in position to be engaged by the articles advanced by the belt 12 and shifted under the pressure of the articles to thereby set in operation through the one-way clutch shown in Figs. 6, 7, and 8, the feed plungers 16 which shift the articles accumulated on the plate 13 transversely of the direction of movement of the belt 12 and ultimately onto a third belt 17 on which the articles are advanced in three lines, and, if desired, in spaced groups of three, to the packing machine.

As shown in Figs. 1 and 3, the table 13 partially overlies the belt 17 and has its edge which overlies the belt stepped as shown at 18, Fig. 1, so that the articles fed across the plate by the separate feed plungers will be arranged to form separate rows respectively on the feed belt 17.

The stop 14 is separated from the end of belt 12 by a distance such that three articles will be assembled on the plate 13 and will transmit the pressure of the following articles advanced by the belt to shift the stop and release the clutch 22 through which the plungers are actuated. If desired, a pressure roll 18a may be provided to hold the articles against the moving belt and thus increase the pressure upon stop 14.

The plunger-actuating mechanism is shown in enlarged section in Fig. 4. As shown, there are three plungers 16 each of which comprises an arcuate arm 19 attached to the upper end of a common cross-head 20 fast to the upper end of a rocker 21 which is oscillated through the one-way clutch 22 previously referred to. This clutch, as shown in Figs. 6 and 7, comprises a sprocket wheel 23 which is continuously driven from the driving motor 24 through suitable speed-reducing connections, shown in Fig. 4. The wheel 23 is loose on the shaft 25, and fixed to the shaft 25 is a hub 26 upon which is pivoted a pawl 27 whose driving tooth is adapted to engage the ratchet 28 fast to the sprocket 23. The pawl 27 has an outwardly projecting arm positioned to be engaged by a stop arm 29, the position of which is controlled by the movable stop plate 14.

The stop 14 shown in Fig. 1 is attached to the rod 30 supported at its outer end for sliding movement in a fixed bearing adjacent the table 13 and carried at its inner end by a vertical arm 31 (see Fig. 4) extending upwardly from the rock-shaft 32 extending across the machine beneath the belt 17, to which rock-shaft is also attached the stop arm 29 which controls the clutch 22. The rock-shaft 32 is preferably supported by anti-friction bearings as shown, to be readily actuated by the pressure of the articles against the plate 14. The pressure of the articles against the plate shifts the arm 29 laterally of the pawl, that is perpendicularly to the plane of the paper as shown in Fig. 6, and to the left as shown in Fig. 5, to thereby release the pawl in a manner to engage its ratchet. The rocker 21 is actuated from the shaft 25 by means of a crank 33 and connecting rod 34. The plungers 16 all move in the same amplitude of movement but each one of the articles is moved by them to a different extent. Thus the first or outer plunger at the left as shown in Fig. 1 which engages the article in contact with the stop plate 14 moves the article engaged by it a distance only equal to the distance of the width of the article or only just sufficient for the next row of articles advanced by the belt 12 to clear it. The middle plunger 16 by reason of the fact that its arcuate support 19 is somewhat longer than the support of the outer plunger, will engage the middle article of the three to be shifted somewhat before the outer plunger engages the outer article and will thus shift the middle article a somewhat greater distance as indicated in Fig. 1. The third plunger whose support 19 is the longest will shift its article through a somewhat greater distance than the middle plunger.

The reason for this arrangement is to provide spaces between the articles on the belt 17 so that they will move toward the point of delivery (usually the feed belt of the packaging machine) in spaced rows separated from each other by the fixed guides 35. The guides 35 are supported above the upper reach of the belt 17 by a bracket 36, as shown in Fig. 4, and extend at their forward ends to points adjacent the stepped edge of the plate 13. Each of the guides except the one adjacent the stop 14 therefore serves as a stop for the articles advanced by the plungers 16 as the articles are advanced over the stepped edge of the plate 13 onto the belt.

The articles on the plate 13 are shifted slightly so that the next row advanced by plungers 16 will not strike their corners, by a shifter 37 which is carried by a rock-shaft 38 extending across the machine adjacent the path of movement of the articles advanced by the innermost plunger 16. This shifter rocks slightly at each operation of the plungers 16 so as to be clear of the path of movement of the articles as they are advanced by the plunger 16 and to then swing back into a predetermined position to move the three articles left on bed plate 13 sufficiently to prevent the corner of the single article on the central step from being struck by the corner of one of the articles to be next advanced by plungers 16. This shifter is operated from the plunger-operating arm 21 by means of an arm 39 attached to the supporting shaft 40 of arm 21 and provided with a pin 41 overlying a rock-arm 42 which is loosely mounted in the shaft 40.

The arm 42 is connected by a link 43 with an arm 44 attached to the shaft 38 by the shifter 37. The spring 45 which surrounds the shaft 38 normally tends to hold the shifter 37 out of engagement with the articles on the plate 13. Just before the plunger 16 comes to its position of rest, that is, just as the pawl 27 of the clutch 22 engages its stop member 29, the pin 39 engages the arm 42 and pulls it downward to thereby press the shifter 37 forward against the articles.

The operation of the machine will be readily understood from the foregoing description. The operation of the stop arms 6 constituting the escapement mechanism arranges the incoming articles in whatever order they may be delivered into a single row on the belt 4, which single row of articles is delivered to the belt 12 and thence to the bed-plate or table 13 upon which they remain until enough articles accumulate for the pressure of the belt 12 through the frictional engagement of the articles with the belt to become sufficient to shift the stop 14 and thereby release the one-revolution clutch which causes the plungers 16 to be operated.

Each movement of the plungers 16 shifts three articles crosswise of the plate 13. The outermost article will be shifted beyond the edge of the plate onto the belt. The middle article will be shifted far enough to engage the previously shifted article which has remained at rest adjacent the stepped edge of the plate 13, and shift it onto the belt, while the third plunger will shift its article to a position to discharge one of the two articles which are always present at this position on the plate, onto the belt, leaving the article directly engaged by the plunger on the plate along with the previously shifted article.

Thus at each operation of the plungers three articles in predetermined stepped relation are simultaneously delivered to the belt 17 by which they are advanced toward the delivery end of the machine. The repeated operation of the plungers causes the successive delivery of articles to the belt 17 in this stepped relation, and the articles are thereby formed into three separate lines. So long as the supply of articles at the gates 10 of the escapement mechanism is maintained, the articles in the three separate lines on belt 17 will be arranged in relatively close formation so that the lines will be unbroken, that is, will have no gaps in them. Moreover, should the supply of articles in one of the chutes 1 or 2 be reduced, or even cease entirely, the number of articles delivered at the point of delivery by each of the three rows on belt 17 will continue to be equal, although the rate of delivery, that is, the number of articles delivered in a given time, will be reduced. This is a desirable manner of delivery of articles to some of the most successful forms of packing machines. It will be understood that by increasing the dimensions of bed plate 13, increasing the number of steps thereon and by increasing the width of belt 17 and the number of plungers 16, the single line of articles on belt 12 can be rearranged into a greater number of lines.

By increasing the speed of belt 17, the three articles delivered thereto in the predetermined stepped relation by the plungers 16 may be spaced apart from one another, thereby delivering the articles as a pre-arranged group of three, which is a desirable formation for some forms of packaging machines.

In the modification shown in Fig. 9 we have disclosed a mechanism for receiving articles from four separate delivery chutes marked 1a, 2a, 3a, and 4a, and bringing them into a single row onto a continuously moving belt 12a which serves to advance the articles in a single row with the articles extending transversely of the direction of movement as is desired for some packing machines.

The separate chutes 1a, 2a, etc., are arranged to deliver the articles in different rows on the face of the feed belt 50 which advances the articles transversely of the feed chutes between fixed guides 51 into contact with fixed stops 52 positioned to be engaged by the respective articles at points near their corners. Overlying the feed belt 50 adjacent stops 52 is a rod 53 carrying downwardly projecting fingers 54 which in the normal position of rod 53 extend into alignment with the fixed guides 51 so that the articles pass freely between the fingers 54 and thus come into engagement with the stops.

Upon each movement of rod 53 the fingers 54 which thus lie adjacent the side faces of the several articles at the corners where they engage the stops 52, will serve to shift the articles laterally to clear the stops 52 and be again free to advance with the belt 50. Shaft 53 is actuated by the rockarm 55 and cam 56 which is continuously actuated from the belt-driving drum 57 through the sprocket connection as shown. The speed of movement of the belt and the operation of the escapement fingers 54 is so timed that the articles released by the escapement will advance a sufficient distance before the next operation of the escapement, for the belt 12a, to which the articles are delivered by the belt 50, to shift the articles forming one group clear of the belt 50 before the next group is advanced by the belt 12a. Hence, if all the rows of articles on the belt 50 are without gaps, the belt 12a will deliver a single row of articles without gaps to the packaging machine or other point of delivery. If there are gaps in any of the rows on belt 50 there will be similar gaps in the belt 12a, but whatever the arrangement of the articles coming into the machine, they will be delivered by the machine in a single row.

The apparatus as shown in Fig. 9 can therefore be used for feeding articles to packing machines, which are designed to receive articles from a single feed row and arrange them in layers of predetermined number whether or not there be gaps in the row of articles fed to the machine. A packing machine of this type is shown in the patent to Mudd, No. 1,659,831. This patent is owned by the assignees of this application.

The apparatus shown in Fig. 9 may also be used, if desired, in place of a portion of the apparatus shown in Fig. 1, that is, in place of the portion of the machine shown at the right of Fig. 1 including the belt 4 and the escapement mechanism associated therewith. Such a substitution might be made where, instead of receiving the articles from only two chutes as shown in Fig. 1, they were to be received from a greater number of chutes, such for example, as the four chutes shown in Fig. 9.

With this rearrangement of the machine shown in Fig. 1, the belt 50 of Fig. 9 would deliver the articles to belt 12 of Fig. 1 instead of to belt 12a of Fig. 9. The articles would then be carried forward by belt 12 to the bed plate 13, and regardless of whether or not there were any gaps in the line of articles on belt 12 produced either by a failure of the supply of articles from one of the chutes 1a, 2a, 3a, or 4a, or by the operation of belt 12 at an incorrect speed with respect to the speed of belt 50, thereby producing gaps between the successive groups of four articles, the plungers 16 would automatically rearrange the articles in three unbroken lines on belt 17. It will be understood that with this rearrangement of the apparatus of Fig. 1, the faces of plungers 16 would be constructed to conform with the ends rather than the sides of the articles, and the dimensions of plate 13 and its associated parts would be similarly changed.

Although packing machines which are adapted to receive the articles to be packed, in a plurality of separate lines, may be fed or supplied with articles by as many labeling machines as there are lines, this arrangement is undesirable because it is frequently convenient if not necessary to stop the operation of one or more of the labeling machines, and this would make it necessary to simultaneously shut down the packing machine. With the machine shown in Fig. 1 of the present application placed between the labeling machines and the packing machine, however, the operation of the packing machine may continue even though one or more of the labeling machines are shut down, provided of course that the supply of articles from the labeling machines shall continue in operation, at a sufficient rate to meet the requirements of the packing machine.

This result is effected in the case of a supply from two labeling machines by the escapement mechanism shown at the right of Fig. 1 which brings these two lines into a single line on belt 4 and thereafter on belt 12. In the case where the articles are supplied by more than two labeling machines, the mechanism shown in Fig. 9 will bring the articles from these several lines into a single line on belt 12. The rearranging mechanism including the stepped bed plate 13 and the plungers 16 will then place the articles of the single row in the desired number of separate parallel, unbroken feed lines for delivery to the packing machine.

We claim:

1. In a machine of the class described, means for advancing articles in a row, and means controlled by the articles for separating a predetermined number of articles from the row to form a group, said means comprising a plunger having separate faces in different planes and mounted for movement laterally of said row, mechanism for operating said plunger, and means controlled by the presence of a full group of articles in the path of said plunger for initiating the movement of said plunger-operating mechanism.

2. In a machine of the class described, means for advancing articles in a row, and means controlled by the articles for separating a predetermined number of articles from the row to form a group, said separating means comprising a plunger having separate faces in different planes arranged to shift the separate articles of said group through different distances.

3. In a machine of the class described, means for advancing articles in a row, and means controlled by the articles for separating a predetermined number of articles from the row to form a group, said separating means comprising a plunger having separate faces in different planes arranged to shift the separate articles of said group through different distances, and means for advancing the several articles of the group in separate rows.

4. In a machine of the class described, means for advancing articles in a single row, and means for dividing the articles into a plurality of separate rows, said means comprising a conveyor wide enough to receive a plurality of rows of articles and mounted for movement in overlapping parallelism with the advancing row of articles and means comprising a plunger having separate faces in different planes for laterally shifting a plurality of articles from the row through different distances to bring them into position overlying different points on said conveyor.

5. In a machine of the class described, means for advancing articles in a single row, and means for dividing the articles into a plurality of separate rows, said means comprising a conveyor wide enough to receive a plurality of rows of articles and mounted for movement in parallelism with the direction of advance of the row of articles and means comprising a plunger having separate faces in different planes for laterally shifting a plurality of articles from the row through different distances to bring them into position overlying different points on said conveyor, and a stepped plate overlying the said conveyor over which said articles are fed, said plate serving to prevent engagement of the respective articles with the conveyor until they have been advanced to their predetermined respective positions.

6. In a machine of the class described, the combination of a conveyor belt for advancing a row of articles, a second conveyor belt of a width to advance a plurality of rows of articles, said belts being arranged in parallelism with each other, and means for transferring a plurality of articles as a group from the first-mentioned belt to the second-mentioned belt, said means comprising a stepped plunger reciprocating periodically to shift a plurality of articles from said first-mentioned belt to different positions overlying said second-mentioned belt.

7. In a machine of the class described, the combination of a conveyor belt for advancing a row of articles, a second conveyor belt of a width to advance a plurality of rows of articles, said belts being arranged in parallelism with each other, and means for transferring a group of articles from the first-mentioned belt to the second-mentioned belt, said means comprising a stepped plate overlying said second-mentioned belt, and a stepped plunger for shifting a plurality of articles from said first-mentioned belt onto and across said plate, the steps of said plunger being at a different depth from the steps of the plate to thereby position the articles in spaced rows on said belt.

8. In a machine of the class described, the combination of a conveyor belt for advancing a row of articles, a second conveyor belt of a width to advance a plurality of rows of articles, said belts being arranged in parallelism with each other, and means for transferring a group of articles from the first-mentioned belt to the second-mentioned belt, said means comprising a stepped plate overlying said second-mentioned belt, reciprocating means for shifting articles laterally from said first-mentioned belt onto said plate and thence onto said second-mentioned belt, some of said articles remaining on said plate between successive reciprocations of said shifting means, and means for moving the articles remaining on said plate parallel with said conveyor belts a sufficient distance to prevent the corners thereof from being engaged by the articles next shifted upon the plate by said shifting means.

9. In a machine of the class described, the combination of means for advancing articles in a row in end-to-end contact, means for separating a predetermined number of articles from the row to form a group, said means including a plunger having separate faces in different planes, mechanism depending for its actuation upon the end-to-end contact of the articles forming the group separated for controlling said means, and means for advancing said group of articles in separate paths.

WALLACE D. KIMBALL.
CORNELIUS I. BRAREN.